(12) United States Patent  (10) Patent No.: US 12,118,270 B1
Bailey  (45) Date of Patent: Oct. 15, 2024

(54) NOTIFICATION CONTROL FOR CONNECTED APPLIANCES

(71) Applicant: Haier US Appliance Solutions, Inc., Wilmington, DE (US)

(72) Inventor: Thomas Allen Bailey, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 12 days.

(21) Appl. No.: 18/300,119

(22) Filed: Apr. 13, 2023

(51) Int. Cl.
G08B 23/00 (2006.01)
G06F 3/16 (2006.01)
G08B 5/36 (2006.01)
G08B 7/06 (2006.01)
H04L 12/28 (2006.01)

(52) U.S. Cl.
CPC .............. *G06F 3/165* (2013.01); *G08B 5/36* (2013.01); *G08B 7/06* (2013.01); *H04L 12/2814* (2013.01)

(58) Field of Classification Search
CPC .. G06F 3/165; G08B 5/36; G08B 7/06; H04L 12/2814
See application file for complete search history.

(56) References Cited

U.S. PATENT DOCUMENTS

| 9,959,727 | B2 | 5/2018 | Fadell et al. |
| 11,851,798 | B1* | 12/2023 | Rodriguez Munoz .. D06F 33/43 |
| 2021/0385106 | A1 | 12/2021 | Kinney et al. |
| 2021/0406536 | A1 | 12/2021 | McLean |
| 2022/0417723 | A1* | 12/2022 | Hahm ................. H04L 12/2809 |
| 2023/0068447 | A1* | 3/2023 | Campbell, III ....... G06F 3/0484 |
| 2023/0314001 | A1* | 10/2023 | Santana .................. F24C 7/086 |
| | | | 126/1 R |
| 2024/0027982 | A1* | 1/2024 | Hu ......................... G06V 10/82 |

FOREIGN PATENT DOCUMENTS

EP   3925500 A1   9/2018

* cited by examiner

*Primary Examiner* — Toan N Pham
(74) *Attorney, Agent, or Firm* — Dority & Manning, P.A.

(57) ABSTRACT

An appliance including an instruction confirmation device and a method for controlling the confirmation device are provided. The appliance comprises a controller configured to communicate with a user input device and to communicate wirelessly with an external device. The confirmation device is adjustable by the user input controls and the external device to generate a confirmatory signal in response to receipt of an instruction or to not generate such a signal.

20 Claims, 2 Drawing Sheets

NOTIFICATION CONTROL FOR CONNECTED APPLIANCES

FIELD OF THE INVENTION

The present disclosure relates to household appliances, in particular to connected household appliances that can be manipulated by an external device through a network.

BACKGROUND OF THE INVENTION

Many household appliances include a user interface or control panel with user input controls or devices for user input of certain controls of the appliance. Some household appliance provide a confirmatory tone or auditory feedback when a user manipulation is successfully received at the control panel.

Some household appliances are now provided with a feature that permits user adjustment of the appliance using an external device through a network. In some cases, the user adjustments made over a network provide the same confirmatory tones when adjustments are successfully received over the network as when made at the control panel. Since a user adjusting an appliance over a network is likely to not be sufficiently close to the appliance to receive the auditory tone from the appliance, the tones may be unnecessary. Further, tones coming from an appliance not apparently under the control of a user may be an annoyance to others in the presence of the appliance.

Accordingly, it may be desirable to provide connected appliances with a feature to turn off the confirmation sounds when commands are received over the network.

BRIEF DESCRIPTION OF THE INVENTION

Aspects and advantages of the invention will be set forth in part in the following description, may be apparent from the description, or may be learned through practice of the invention.

In one exemplary aspect, an appliance comprising a cabinet, a control panel positioned on an exterior of the cabinet, the control panel including user input controls, and a controller in operative communication with the control panel and in wireless communication with an external device through a network is provided. The controller is configured to adjust a confirmation device at the control panel to selectively produce a confirmatory signal in response to an instruction received by the controller from one of the user input device and the external device.

In another exemplary aspect, a method of controlling an appliance comprising a cabinet, a control panel positioned on an exterior of the cabinet, the control panel including a user input device and a sound generator in a first condition and adjustable between a second condition and a third condition, and a controller, the controller in operative communication with the control panel and configured to communicate wirelessly with an external device through a network is provided. The method comprises receiving at the controller an instruction from one of the user input device and the network to adjust the sound generator to one of the second condition and the third condition, and adjusting the sound generator to one of the second condition and the third condition based on the received instruction from the controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
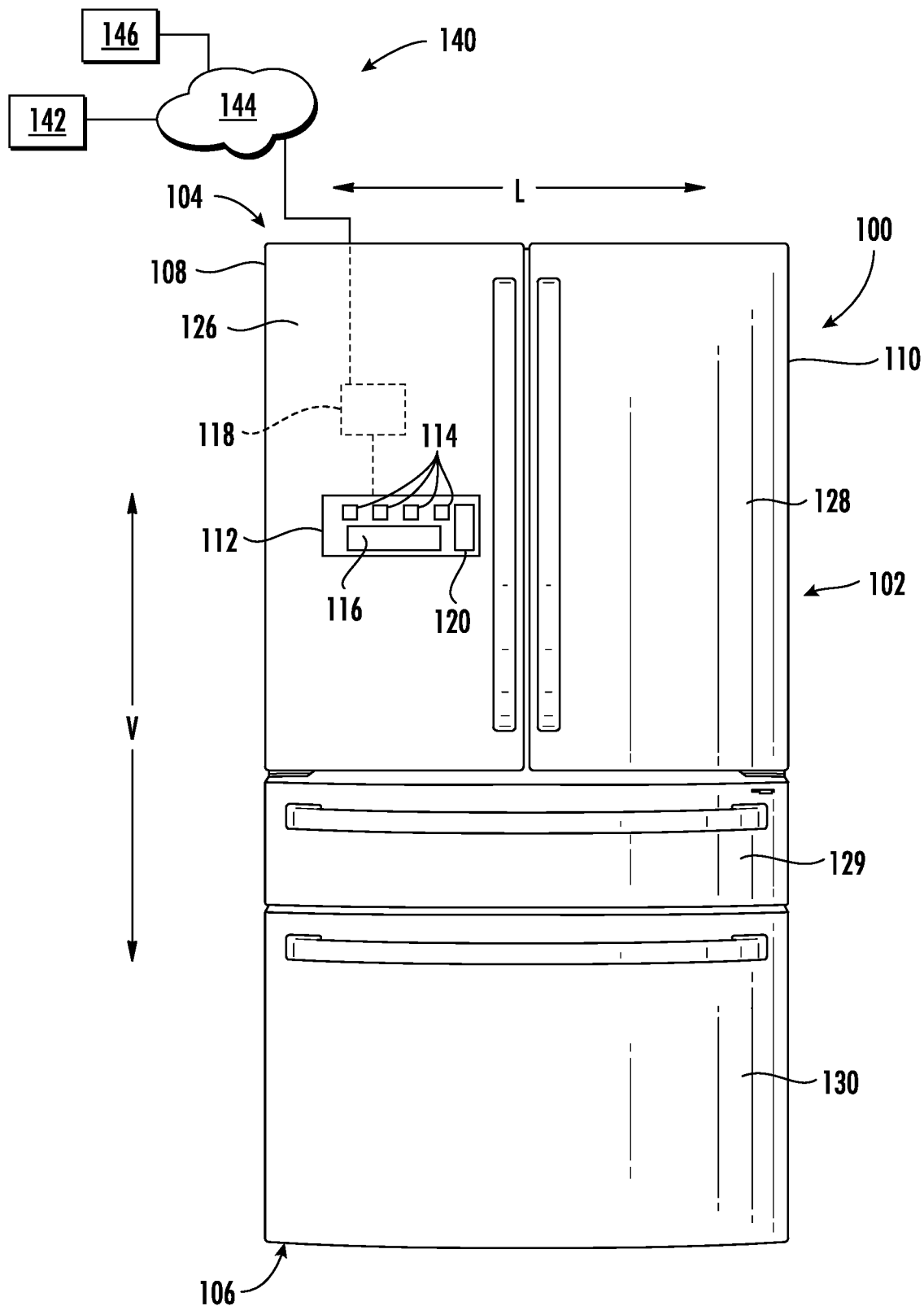
FIG. 1 provides a front view of an exemplary appliance in accordance with the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning to the figures, FIG. 1 provides a front view of an exemplary appliance 100 in accordance with embodiments of the present disclosure. FIG. 1 illustrates a French door refrigerator appliance for ease of illustration only. As will be apparent to one of ordinary skill in the art, embodiments of the present disclosure will apply to any appliance that may benefit from control with an external device through a network. For example, in addition to refrigerator appliances, embodiments may be found useful in use with air conditioners, heat pumps, water heaters, ovens, microwave ovens, washing machines, dryers, ice makers, heating units, and the like. This list is intended to be illustrative, not limiting, as other appliances may benefit from the features of the present disclosure.

As illustrated, appliance 100 generally defines a vertical direction V, a lateral direction L, and a transverse direction T, each of which is mutually perpendicular, such that an orthogonal coordinate system is generally defined.

According to exemplary embodiments, appliance 100 includes a cabinet 102 that is generally configured for containing and/or supporting various components of appliance 100 and which may also define one or more internal chambers or compartments of appliance 100. In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front and a rear along the transverse direction T (not shown). In general, terms such as "left," "right," "front," "rear," "top," or "bottom" are used with reference to the perspective of a user accessing appliance 100.

The illustrative cabinet 102 includes cabinet doors 126, 128 rotatably attached to the cabinet 102 and vertically above cabinet drawers 129, 130, which may be slidably mounted to the cabinet 102. These components are merely illustrative for embodiments of a refrigerator appliance. Other embodiments may or may not have doors or drawers, or may have more or fewer doors or drawers in other configurations or arrangements.

Referring again to FIG. 1, illustrative appliance 100 may include a control panel 112 that may represent a general-purpose Input/Output ("GPIO") device or functional block for appliance 100. In some embodiments, control panel 112 may include or be in operative communication with one or more user input devices 114 (four shown), such as one or more of a variety of digital, analog, electrical, mechanical, or electro-mechanical input devices including rotary dials, control knobs, push buttons, toggle switches, selector switches, and touch pads. Additionally, appliance 100 may include a display 116, such as a digital or analog display device generally configured to provide visual feedback regarding the operation of appliance 100. For example, display 116 may be provided on control panel 112 and may include one or more status lights, screens, light sources, or other visible indicators. According to exemplary embodiments, user input devices 114 and display 116 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

A confirmation device 120 may be included in control panel 112 or may be separate from the control panel 112. The confirmation device 120 may include a sound generator, such as a speaker, and a light source, such as a light emitting diode (LED). In some embodiments, the light source may be included within the display 116. The confirmation device 120 may be operatively connected to the user input controls 114 and the controller 118 and selectively adjustable to provide an audible or visual confirmatory signal when changes are made to the user input devices 114 or settings controlled by the user input devices 114.

The controller 118 may be configured to alter the confirmatory signal when provided with instructions to do so, for example instructions from the user input devices 114 or the external device 142. The user input devices 114 or the external device 142 may selectively adjust the confirmation device 120 to an "on" setting, an "off" setting, or change the audible or visual signal produced by the device 120 with the proper instructions. In some embodiments, the confirmation signal may be placed in an "on" condition when instructions are received from a particular source. For example, the confirmation device may be in an "on" condition for instructions received from the user input devices 114 and in an "off" condition for instructions received from the external device 142. In some embodiments of confirmation devices having multiple features (e.g., sound and light), the "on" or "off" setting may apply to one feature of the confirmation device but not to the other or others. For example, an "off" setting may apply only to the sound signal while the light signal may still be functioning as a confirmatory signal.

Appliance 100 may further include or be in operative communication with a processing device or a controller 118 that may be generally configured to facilitate appliance operation. In this regard, control panel 112, user input devices 114, and display 116 may be in communication with controller 118 such that controller 118 may receive control inputs from user input devices 114, may display information using display 116, and may otherwise regulate operation of appliance 100. For example, signals generated by controller 118 may operate appliance 100, including any or all system components, subsystems, or interconnected devices, in response to the position of user input devices 114 and other control commands. Control panel 112 and other components of appliance 100 may be in communication with controller 118 via, for example, one or more signal lines or shared communication busses. In this manner, Input/Output ("I/O") signals may be routed between controller 118 and various operational components of appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 118 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 118 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 118 may be operable to execute programming instructions or micro-control code associated with an operating cycle of appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 118 as disclosed herein is capable of and may be operable to perform any methods, method steps, or portions of methods as disclosed herein. For example, in some embodiments, methods disclosed herein may be embodied in programming instructions stored in the memory and executed by controller 118.

The memory devices may also store data that can be retrieved, manipulated, created, or stored by the one or more processors or portions of controller 118. The data can include, for instance, data to facilitate performance of methods described herein. The data can be stored locally (e.g., on controller 118) in one or more databases and/or may be split up so that the data is stored in multiple locations. In addition, or alternatively, the one or more database(s) can be connected to controller 118 through any suitable network(s), such as through a high bandwidth local area network (LAN) or wide area network (WAN). In this regard, for example, controller 118 may further include a communication module or interface that may be used to communicate with one or more other component(s) of appliance 100, controller 118, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring still to FIG. 1, a schematic diagram of an external communication system 140 will be described according to an exemplary embodiment of the present subject matter. In general, external communication system 140 is configured for permitting interaction, data transfer, and other communications between appliance 100 and one or more external devices. For example, this communication may be used to provide and receive operating parameters, user instructions or notifications, performance characteristics, user preferences, or any other suitable information for improved performance of appliance 100. In addition, it should be appreciated that external communication system 140 may be used to transfer data or other information to improve performance of one or more external devices or appliances and/or improve user interaction with such devices.

For example, external communication system 140 permits controller 118 of appliance 100 to communicate with a separate device external to appliance 100, referred to generally herein as an external device 142. As described in more detail below, these communications may be facilitated using a wired or wireless connection, such as via a network 144. In general, external device 142 may be any suitable device separate from appliance 100 that is configured to provide and/or receive communications, information, data, or commands from a user. In this regard, external device 142 may be, for example, a personal phone, a smartphone, a tablet, a laptop or personal computer, a wearable device, a smart home system, or another mobile or remote device.

According to some embodiments, controller 118 is in operative communication with the control panel 112 and user input devices 114, and external communication system 140 facilitates wireless communication between the controller 118 and external device 142 through the network 144. The controller 118 may be configured to make changes to the operation of the appliance 100 in response to an instruction or instructions provided by the user input device 114 or the external device 142.

In addition, a remote server 146 may be in communication with appliance 100 and/or external device 142 through network 144. In this regard, for example, remote server 146 may be a cloud-based server 146, and is thus located at a distant location, such as in a separate state, country, etc. According to an exemplary embodiment, external device 142 may communicate with a remote server 146 over network 144, such as the Internet, to transmit/receive data or information, provide user inputs, receive user notifications or instructions, interact with or control appliance 100, etc. In addition, external device 142 and remote server 146 may communicate with appliance 100 to communicate similar information.

In general, communication between appliance 100, external device 142, remote server 146, and/or other user devices or appliances may be carried using any type of wired or wireless connection and using any suitable type of communication network, non-limiting examples of which are provided below. For example, external device 142 may be in direct or indirect communication with appliance 100 through any suitable wired or wireless communication connections or interfaces, such as network 144. For example, network 144 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP. SMTP, FTP), encodings or formats (e.g., HTML, XML), and/or protection schemes (e.g., VPN, secure HTTP, SSL).

External communication system 140 is described herein according to an exemplary embodiment of the present subject matter. However, it should be appreciated that the exemplary functions and configurations of external communication system 140 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

According to embodiments of the present disclosure, the controller 118 is in operative communication with the control panel 112 and in wireless communication with the external device 142 through the network 144. The controller 118 may be configured to selectively adjust the condition of the confirmation device 120 to selectively produce a confirmatory signal in response to an instruction received by the controller 118 from one of the user input devices 114 or from the external device 142. The condition of the confirmation device 120 may include "on" or "off" or an audible or visual signal or series of signals selected from a predetermined pattern. Accordingly, in an embodiment the controller 118 may adjust the confirmation device 120 to an "on" condition for instructions or signals with the external device 142 as the source. In another embodiment, the controller 118 may adjust the condition of the confirmation device 120 to be "on" for instructions received from either of the external device 142 and the user input devices 114. The confirmation signal may be either a visible signal, e.g., a signal from a light source, or may be an audible signal, e.g., from a speaker.

Generally, the confirmation device 120 may be adjusted to one of at least three conditions. In the first condition, the confirmation device 120 is adjusted to an "on" condition for subsequent instructions or signals received from either of the external device 142 or the user input devices 114. Subsequent instructions are instructions or signals that arrive at the controller chronologically after the instruction changing the condition of the confirmation device 120. Accordingly, regardless of the source of the instruction or signal received by the controller 118, the confirmatory signal will be produced. The confirmation signal may be audible, visual, or both in the first condition. In some embodiments, the first condition may be a default condition, for example an initial setting as manufactured or when the appliance is reset, for example after a power loss, or as may be invoked in an attempt to cure a fault in the appliance 100.

In the second condition for the confirmation device 120, the controller 118 adjusts the device to an "off" condition for one or more of the confirmation signals, regardless of the source of the signal or instruction. In embodiments of the second condition, the audible signal may be adjusted to "off" and the visual signal may be in an "on" condition. In another embodiment of the second condition, the audible signal may be adjusted to "on" and the visual signal may be in an "off" condition. In still another embodiment of the second condition, the audible signal may be adjusted to "off" and the visual signal may be adjusted to an "off" condition.

In a third condition for the confirmation device 120, the controller 118 adjusts the confirmation device 120 such that no confirmation signal is produced in response to a signal or instruction originating at the external device 142, and a confirmation signal is produced in response to a signal or instruction originating from the user input devices 114.

According to embodiments, confirmation device 120 can be adjusted from the first, or default, condition with a command or instruction from either the external device 142 or the user input device 114. In cases where instructions or signals arrive at the controller from both sources, the latest chronologically received signal prevails unless barred for a predetermined reason. For example, from the first condition, either the external device 142 or the user input device 114 can send a signal or instruction to the controller 118 to change the condition from the first condition to one of the second or third conditions. Accordingly, a signal from either source can instruct the controller 118 to prevent the confirmation device 120 from making an audible signal, a visual signal, or both in response to subsequent signals or instructions.

In embodiments, the confirmation device 120 can be adjusted from the second or third condition only with an instruction from the user input device 114. Accordingly, once the confirmation device 120 is adjusted to a condition in which no signal is generated regardless of the source 114, 142 (second condition) or it is adjusted to a condition in which no confirmatory signal is generated for instructions or signals coming from the external device 142 (third condition), subsequent instructions to change the condition of the confirmation device 120 sent by the external device 142 through the network 144 are ineffective. Controller 118 will not change the condition of the confirmation device 120 unless the instruction is sent from the user input device 114. For example, the confirmation device in the third condition can only be adjusted to the first condition with a command from the user input device.

Figure 2:
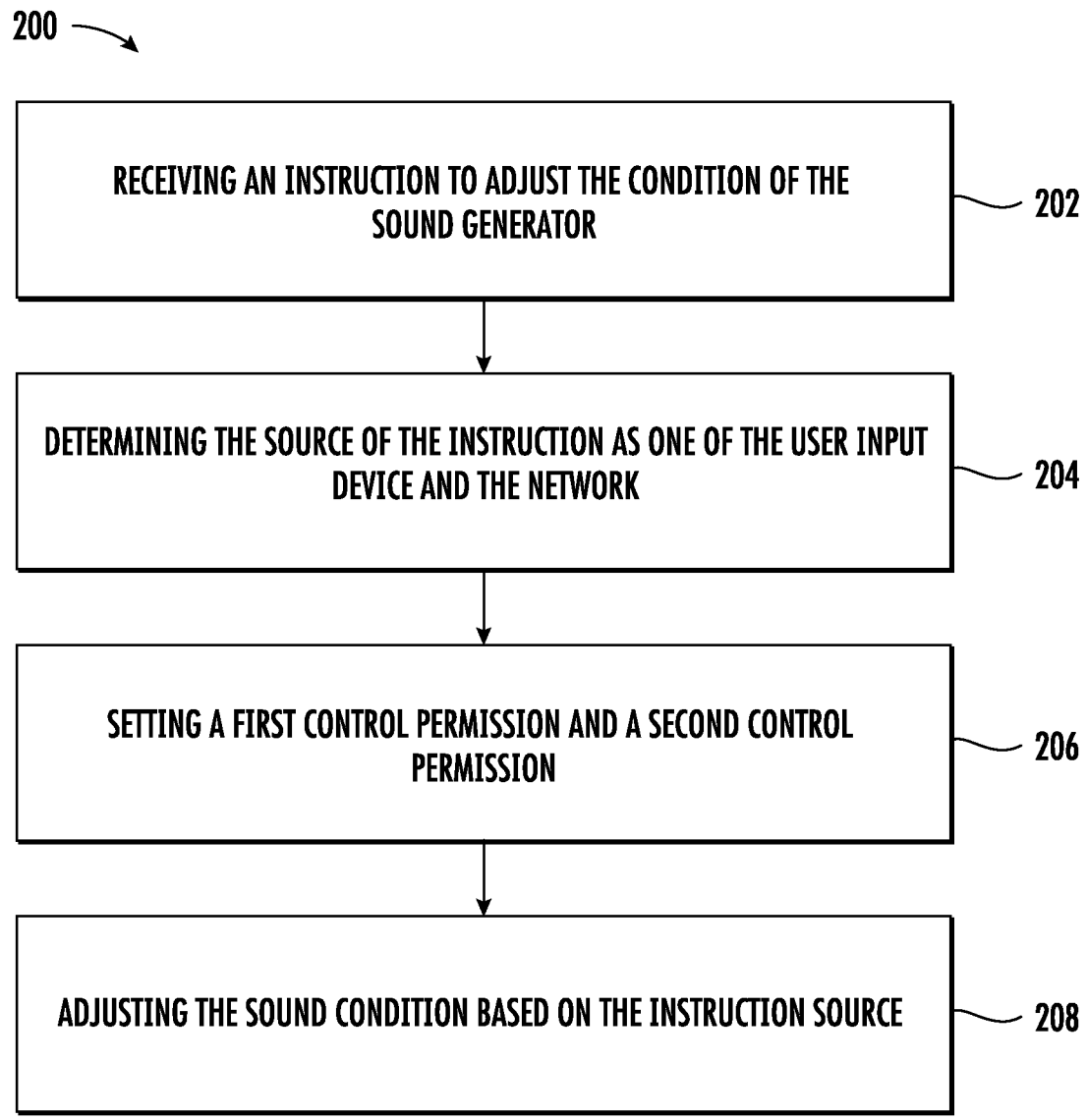
FIG. 2 illustrates a method of operation for an appliance in accordance with an embodiment of the present disclosure.

Now that the construction of a connected appliance with sound control in accordance with this disclosure has been presented, an exemplary method 200 of operation for a connected appliance with sound control will be described with reference to FIG. 2. Method 200 begins at 202 with receiving at the controller 118 an instruction from one of the user input device 114 and the network 144 to adjust the condition of the sound generator of the confirmation device 120. The confirmation device 120 is in a second condition in which the sound generator does not generate a sound regardless of the source of the instruction arriving at the controller 118. The instruction received is to change the condition of the sound generator at confirmation device 120 to one of a third condition and a first condition. In the third condition, the sound generator does not generate a sound in response to a subsequently received instruction from the network and generates a sound in response to an instruction from the control panel. In the first condition, the sound generator generates a sound in response to a subsequently received instruction from either or both the control panel and the network.

At 204, the controller determines the source of the instruction received. The two available sources are the user input device and the network. The controller can determine the source of the instruction using the processing capabilities of the controller. The signals may have special characteristics or signatures to facilitate the analysis.

At 206, first and second control permissions are set depending on the source determined at 204. The first control permission attaches if the instruction source was the user input device. The second control permission attaches if the instruction source was the network.

At 208, the condition of the sound generator at the confirmation device is set depending on the control permission attached. If the first control permission attaches, corresponding to the user input device as the source of the instruction, the condition of the sound generator is changed in accordance with the instruction. The condition may be changed to the third condition or the first condition, depending on the instruction received. If the second control permission attaches, the source of the instruction was identified as the network. As discussed above, the commands from the network to adjust the condition to the third condition or the first condition are ineffective. The condition of the sound generator remains in the second condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An appliance comprising:
    a cabinet defining a vertical direction, a lateral direction, and a transverse direction, each of which is mutually perpendicular;
    a control panel positioned on an exterior of the cabinet, the control panel including a user input device; and
    a controller in operative communication with the control panel and in wireless communication with an external device through a network, wherein the controller is configured to adjust a confirmation device at the control panel to selectively produce a confirmatory signal in response to an instruction received by the controller from one of the user input device and the external device.

2. The appliance of claim 1, wherein the confirmation device includes at least one of a sound generator and a light source.

3. The appliance of claim 2, wherein the light source generates a visible signal in response to the controller receiving an instruction from the user input device or from the external device.

4. The appliance of claim 2, wherein the sound generator is selectively adjustable by the controller between at least a first condition, a second condition, and a third condition in response to the instruction received by the controller from the user input device.

5. The appliance of claim 4, wherein in the first condition the sound generator generates a sound in response to a subsequent instruction received from the user input device or the external device.

6. The appliance of claim 4, wherein in the first condition the sound generator is selectively adjustable to one of a second condition and a third condition in response to an instruction received by the controller from the user input device or the external device.

7. The appliance of claim 4, wherein in the second condition the sound generator does not generate a sound in response to a subsequent instruction received from the user input device or the external device.

8. The appliance of claim 7, wherein in the second condition the light source generates a visible signal in response to the controller receiving a subsequent instruction from the user input device or from the external device.

9. The appliance of claim 4, wherein in the third condition the sound generator generates a sound in response to a subsequent instruction received from the control panel and does not generate a sound in response to a subsequent instruction received from the external device.

10. The appliance of claim 2, wherein the sound generator is selectively adjustable by the controller from a first condition to one of a second condition or a third condition in response to the instruction received by the controller from the external device.

11. The appliance of claim 10, wherein the light source generates a visible signal in response to the controller receiving a subsequent instruction from the control panel or the external device.

12. The appliance of claim 10, wherein in the first condition, the sound generator generates a sound in response to a subsequent instruction received from the user input device or the external device.

13. The appliance of claim 10, wherein in the second condition, the sound generator does not generate a sound in response to a subsequent instruction received from the user input device or the external device.

14. The appliance of claim 10, wherein in the third condition the sound generator generates a sound in response to a subsequent instruction received from the user input device and does not generate a sound in response to a subsequent instruction received from the external device.

15. The appliance of claim 14, wherein the sound generator is switchable by the controller to at least the first condition in response to a subsequent instruction received from the user input device and is not switchable to the first condition in response to a subsequent instruction received from the external device.

16. A method of controlling an appliance comprising a cabinet, a control panel positioned on an exterior of the cabinet, the control panel including a user input device and a sound generator in a first condition and adjustable between a second condition and a third condition, and a controller, the controller in operative communication with the control panel and configured to communicate wirelessly with an external device through a network, the method comprising:
    receiving at the controller an instruction from one of the user input device and the network to adjust the sound generator to one of the second condition and the third condition; and
    adjusting the sound generator to one of the second condition and the third condition based on the received instruction from the controller; and
    wherein in the second condition, the sound generator does not generate a sound in response to a subsequently received instruction from the control panel or from the network and in the third condition, the sound generator generates a sound in response to a subsequently received instruction from the control panel and does not generate a sound in response to a subsequently received instruction from the network.

17. The method of claim 16, further comprising receiving an instruction from the user input device at the controller to adjust the sound generator to the first condition; and
adjusting the sound generator to the first condition.

18. The method of claim 16, wherein receiving an instruction at the controller comprises receiving one or more signals from the user input device and the network, wherein a latest chronological signal received at the controller prevails.

19. A method of controlling an appliance comprising a cabinet, a control panel positioned on an exterior of the cabinet, the control panel including a user input device and a sound generator in a second condition, the condition adjustable between a third condition and a first condition, and a controller, the controller in operative communication with the user input device and configured to communicate wirelessly with an external device through a network, the method comprising:
receiving an instruction at the controller to adjust the condition of the sound generator;
determining a source of the instruction to be one of the user input device and the network;
setting a first control permission of the adjustable sound generator corresponding to the user input device as the instruction source and a second control permission corresponding to the network as the instruction source; and
adjusting the condition based on the instruction source.

20. The method of claim 19, wherein:
in the first control permission, the sound generator accepts a subsequent instruction from the user input device and the network; and
in the second control permission, the sound generator accepts subsequent instructions from the user input device and not from the network.

* * * * *